United States Patent
Zhou et al.

(10) Patent No.: US 12,324,033 B2
(45) Date of Patent: *Jun. 3, 2025

(54) IMPLICIT BEAM INDICATION

(71) Applicant: QUALCOMM Incorporated, San Diego, CA (US)

(72) Inventors: Yan Zhou, San Diego, CA (US); Qian Zhang, Basking Ridge, NJ (US); Sony Akkarakaran, San Diego, CA (US); Wooseok Nam, San Diego, CA (US); Mostafa Khoshnevisan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/360,490

(22) Filed: Jul. 27, 2023

(65) Prior Publication Data

US 2024/0032119 A1 Jan. 25, 2024

Related U.S. Application Data

(63) Continuation of application No. 17/241,959, filed on Apr. 27, 2021, now Pat. No. 11,758,592.
(Continued)

(51) Int. Cl.
*H04W 76/11* (2018.01)
*H04W 16/28* (2009.01)
(Continued)

(52) U.S. Cl.
CPC ............ *H04W 76/11* (2018.02); *H04W 16/28* (2013.01); *H04W 72/046* (2013.01);
(Continued)

(58) Field of Classification Search
CPC ... H04W 76/11; H04W 16/28; H04W 72/046; H04W 72/23; H04W 74/0833;
(Continued)

(56) References Cited

U.S. PATENT DOCUMENTS

| 2013/0077513 A1 | 3/2013 | Ng et al. |
| 2017/0111886 A1 | 4/2017 | Kim et al. |

(Continued)

FOREIGN PATENT DOCUMENTS

| WO | WO-2018089213 A1 | 5/2018 |
| WO | WO-2019233352 A1 | 12/2019 |

(Continued)

OTHER PUBLICATIONS

International Search Report and Written Opinion—PCT/US2021/029600—ISA/EPO—Jul. 23, 2021.
(Continued)

*Primary Examiner* — Candal Elpenord
(74) *Attorney, Agent, or Firm* — Holland & Hart LLP

(57) ABSTRACT

Methods, systems, and devices for wireless communications are described. A user equipment (UE) may receive a beam configuration for each physical cell identifier (PCI) of a set of candidate PCIs. A beam configuration for a PCI may include, for example, transmission configuration indicator (TCI) states for downlink channels and reference signals or spatial relations for uplink channels and reference signals. The UE may receive an indication of a selected subset of PCIs of the set of candidate PCIs. The UE may apply the beam configuration for each PCI of the selected subset of PCIs based on the indication of the selected subset of PCIs. The UE may then communicate according to the beam configurations for the selected subset of PCIs.

19 Claims, 14 Drawing Sheets

Related U.S. Application Data

(60) Provisional application No. 63/018,273, filed on Apr. 30, 2020.

(51) Int. Cl.
    *H04W 72/044*     (2023.01)
    *H04W 72/23*      (2023.01)
    *H04W 74/08*      (2024.01)
    *H04W 74/0833*    (2024.01)
    *H04W 80/02*      (2009.01)

(52) U.S. Cl.
    CPC ....... *H04W 72/23* (2023.01); *H04W 74/0833* (2013.01); *H04W 80/02* (2013.01)

(58) Field of Classification Search
    CPC ... H04W 80/02; Y02D 30/70; H04L 41/0806; H04B 7/0665; H04B 7/0617
    USPC .................................................. 370/329–330
    See application file for complete search history.

(56) References Cited

U.S. PATENT DOCUMENTS

| | | | |
|---|---|---|---|
| 2019/0090193 A1 | 3/2019 | Liu et al. | |
| 2019/0379506 A1 | 12/2019 | Cheng | |
| 2019/0387440 A1 | 12/2019 | Yiu et al. | |
| 2020/0314818 A1 | 10/2020 | Jin et al. | |
| 2021/0099954 A1 | 4/2021 | Agiwal et al. | |
| 2021/0329515 A1 | 10/2021 | Sharma et al. | |
| 2021/0345429 A1 | 11/2021 | Zhou | |
| 2022/0264462 A1 | 8/2022 | Bao et al. | |
| 2023/0078059 A1* | 3/2023 | Zhang | H04W 36/0094 370/331 |
| 2023/0092905 A1* | 3/2023 | Zhang | H04L 5/001 370/331 |

FOREIGN PATENT DOCUMENTS

| WO | WO-2020033549 A1 | 2/2020 |
|---|---|---|
| WO | WO-2020069415 | 4/2020 |

OTHER PUBLICATIONS

International Preliminary Report on Patentability—PCT/US2021/029600, The International Bureau of WIPO—Geneva, Switzerland—Nov. 10, 2022.

* cited by examiner

IMPLICIT BEAM INDICATION

CROSS REFERENCE

The present application for patent is a continuation of U.S. Non-Provisional application Ser. No. 17/241,959 by ZHOU et al., entitled "IMPLICIT BEAM INDICATION," filed Apr. 27, 2021, which claims the benefit of U.S. Provisional Patent Application No. 63/018,273 by ZHOU et al., entitled "IMPLICIT BEAM INDICATION," filed Apr. 30, 2020, each of which are assigned to the assignee hereof, and are expressly incorporated by reference herein in their entirety.

FIELD OF TECHNOLOGY

The following relates generally to wireless communications and more specifically to implicit beam indication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may be configured with multiple candidate cells to communicate with a wireless communications network. The UE may be configured to communicate with a subset of the candidate cells for a duration. Some techniques for configuring and managing the UE and the subset of candidate cells based on inter-cell mobility are deficient.

SUMMARY

The described techniques relate to improved methods, systems, devices, and apparatuses that support implicit beam indication. Generally, the described techniques provide for indicating one or more beam configurations to a user equipment (UE) for candidate physical cell identifiers (PCIs) before receiving an indication of a selected subset of the candidate PCIs. The UE may, in some examples, be served by multiple cells. In some cases, a serving cell may have multiple transmission/reception points (TRPs) that may be at different locations, and each TRP may have a different PCI. The UE may be served by a subset of the candidate PCIs of the serving cell. In some cases, the UE may be configured with a group of serving cells, in which there may be a single candidate PCI per serving cell, and the UE may be served by a selected subset (e.g., one or more) of the group of serving cells. Wireless communications systems described herein may implement techniques for enhanced implicit beam configuration indications. For example, a UE may be configured (e.g., pre-configured) with one or more beam configurations for at least some, if not each, of the candidate PCIs, and the UE may apply one or more of the beam configurations based on an implicit indication of one or more selected beam configurations. For example, the beam configurations for different channels and reference signals associated with a candidate PCI of the selected group of candidate PCIs may be configured at (e.g., pre-configured at) or indicated to (e.g., pre-indicated to) the UE. Then, when the UE receives an indication of the selected set of candidate PCIs, the UE may implicitly apply the configured beam configurations corresponding to the selected set of candidate PCIs.

A method of wireless communications at a UE is described. The method may include receiving a beam configuration for each physical cell identifier of a set of candidate physical cell identifiers, receiving an indication of a selected subset of physical cell identifiers of the candidate set of physical cell identifiers, and applying the beam configuration for each physical cell identifier of the selected subset of physical cell identifiers based on the indication of the selected subset of physical cell identifiers.

An apparatus for wireless communications at a UE is described. The apparatus may include a processor, memory coupled with the processor, and instructions stored in the memory. The instructions may be executable by the processor to cause the apparatus to receive a beam configuration for each physical cell identifier of a set of candidate physical cell identifiers, receive an indication of a selected subset of physical cell identifiers of the candidate set of physical cell identifiers, and apply the beam configuration for each physical cell identifier of the selected subset of physical cell identifiers based on the indication of the selected subset of physical cell identifiers.

Another apparatus for wireless communications at a UE is described. The apparatus may include means for receiving a beam configuration for each physical cell identifier of a set of candidate physical cell identifiers, receiving an indication of a selected subset of physical cell identifiers of the candidate set of physical cell identifiers, and applying the beam configuration for each physical cell identifier of the selected subset of physical cell identifiers based on the indication of the selected subset of physical cell identifiers.

A non-transitory computer-readable medium storing code for wireless communications at a UE is described. The code may include instructions executable by a processor to receive a beam configuration for each physical cell identifier of a set of candidate physical cell identifiers, receive an indication of a selected subset of physical cell identifiers of the candidate set of physical cell identifiers, and apply the beam configuration for each physical cell identifier of the selected subset of physical cell identifiers based on the indication of the selected subset of physical cell identifiers.

A method of wireless communications at a base station is described. The method may include transmitting, to a UE, a beam configuration for each physical cell identifier of a set of candidate physical cell identifiers, transmitting an indication of a selected subset of physical cell identifiers of the set of candidate physical cell identifiers, and communicating, with the UE, via one or more cells corresponding to the selected subset of physical cell identifiers according to the beam configuration for each physical cell identifier of the selected subset of physical cell identifiers.

An apparatus for wireless communications at a base station is described. The apparatus may include a processor, memory coupled with the processor, and instructions stored in the memory. The instructions may be executable by the processor to cause the apparatus to transmit, to a UE, a beam configuration for each physical cell identifier of a set of candidate physical cell identifiers, transmit an indication of a selected subset of physical cell identifiers of the set of candidate physical cell identifiers, and communicate, with the UE, via one or more cells corresponding to the selected subset of physical cell identifiers according to the beam configuration for each physical cell identifier of the selected subset of physical cell identifiers.

Another apparatus for wireless communications at a base station is described. The apparatus may include means for transmitting, to a UE, a beam configuration for each physical cell identifier of a set of candidate physical cell identifiers, transmitting an indication of a selected subset of physical cell identifiers of the set of candidate physical cell identifiers, and communicating, with the UE, via one or more cells corresponding to the selected subset of physical cell identifiers according to the beam configuration for each physical cell identifier of the selected subset of physical cell identifiers.

A non-transitory computer-readable medium storing code for wireless communications at a base station is described. The code may include instructions executable by a processor to transmit, to a UE, a beam configuration for each physical cell identifier of a set of candidate physical cell identifiers, transmit an indication of a selected subset of physical cell identifiers of the set of candidate physical cell identifiers, and communicate, with the UE, via one or more cells corresponding to the selected subset of physical cell identifiers according to the beam configuration for each physical cell identifier of the selected subset of physical cell identifiers.

DETAILED DESCRIPTION

A user equipment (UE) in a wireless communications system may be served by multiple cells. The UE may be handed over or reassigned to different cells over time as channel conditions change, as the UE moves in the system, etc. In some cases, there may be two modes associated with the UE being served by multiple cells.

In a first mode, each serving cell may have multiple transmission/reception points (TRPs) at different locations, and each TRP may have a different physical cell indicator (PCI). The UE may be served by a subset of PCIs (e.g., candidate PCIs) of a serving cell, and the selected subset of PCIs may be changed, for example via downlink control information or a medium access control (MAC) control element (CE).

In a second mode, the UE may be configured with a group of serving cells with a single PCI per serving cell. The UE may be served by a selected subset of the group of serving cells, which can be changed via downlink control information (DCI) or MAC CE. In some other wireless communications systems, after the UE receives an indication of a selected subset of PCIs, a base station (e.g., that transmitted the indication of the subset of the selected PCIs) may explicitly indicate beam configurations (e.g., activated transmission configuration indicator (TCI) states, spatial relations) for downlink and uplink channels and reference signals for the PCIs. This signaling, sent after the UE is configured with the PCIs, may increase cell switching latency and affect reliability, as the UE may not have the correct beamforming configurations for the PCIs until receiving this signaling.

Wireless communications systems described herein, however, may implement techniques for enhanced implicit beam configuration indications. For example, a UE may be configured (e.g., pre-configured) with beam configurations for at least some of, if not each of, the candidate PCIs, and the UE may apply one or more beam configurations based on an implicit indication of one or more selected beam configurations. For example, the beam configurations for different channels and reference signals associated with a PCI of the selected group of PCIs may be configured at (e.g., pre-configured at) or indicated to (e.g., pre-indicated to) the UE. Then, when the UE receives an indication of the selected set of PCIs, the UE may implicitly apply the pre-configured beam configurations corresponding to the selected set of PCIs. This may remove the additional signaling of other different systems, reducing cell switching latency and ensuring the UE has the beamforming configurations to improve reliability.

Aspects of the disclosure are initially described in the context of wireless communications systems. Aspects of the disclosure are further illustrated by and described with reference to apparatus diagrams, system diagrams, and flowcharts that relate to implicit beam indication.

Figure 1:
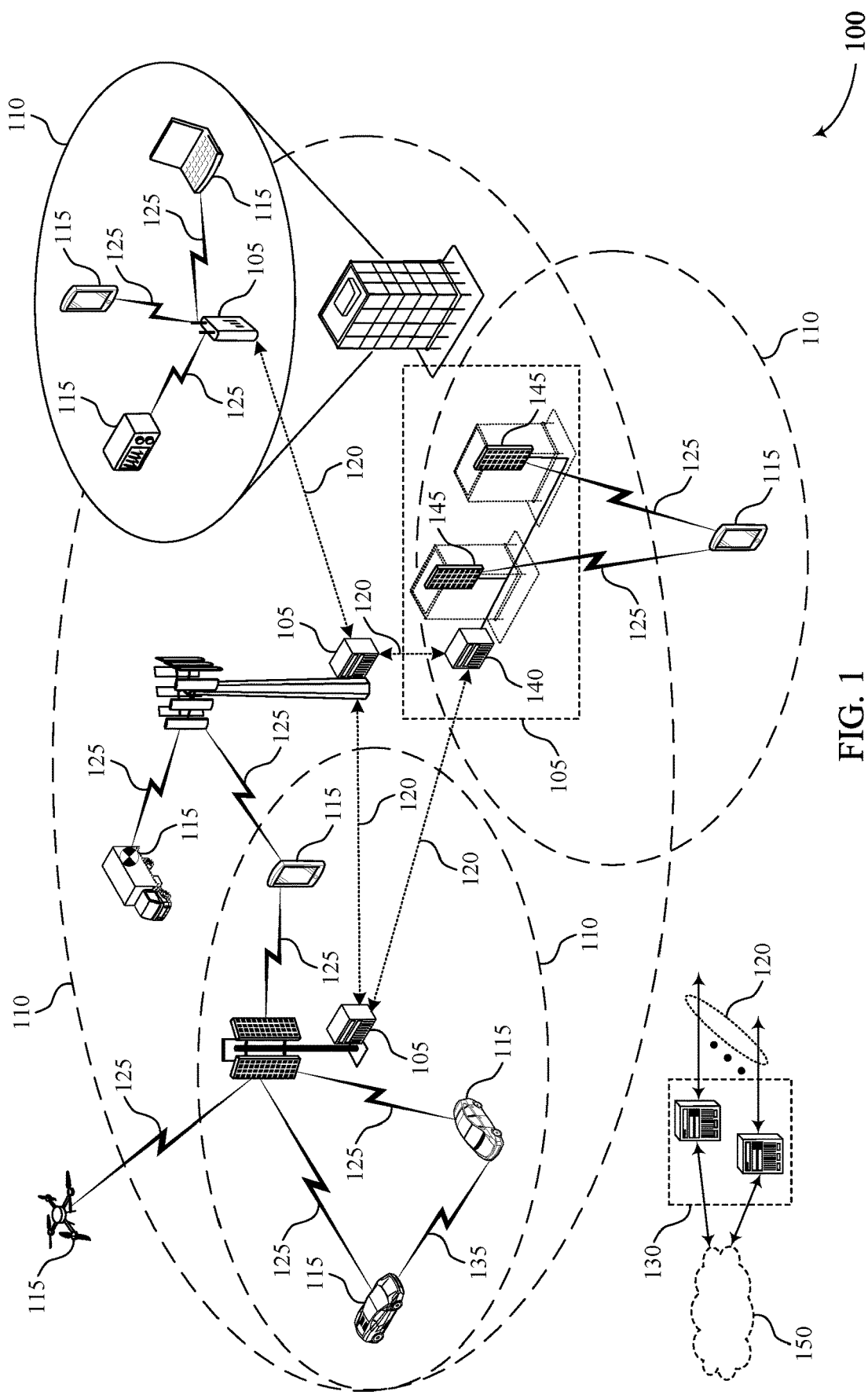
FIG. 1 illustrates an example of a system for wireless communications that supports implicit beam indication in accordance with aspects of the present disclosure.

FIG. 1 illustrates an example of a wireless communications system 100 that supports implicit beam indication in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of T, =1/($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., N f) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may be indicated beam configurations for a candidate PCIs before receiving an indication of the selected subset of PCIs. The UE 115 may be served by multiple cells. In some cases, a serving cell may have multiple TRPs at different locations, each TRP may have a different PCI, and the UE 115 may be served by a subset of PCIs of a serving cell. In some cases, the UE may be configured with a group of serving cells with a single PCI per serving cell, and the UE may be served by a selected subset of the group of serving cells. The wireless communications system 100 may implement techniques for enhanced implicit beam configuration indications. For example, a UE 115 may be pre-configured with beam configurations for each candidate PCI, and the UE 115 may apply beam configurations based on an implicit indication of selected beam configurations. For example, the beam configurations for different channels and reference signals associated with a PCI of the selected group of PCIs may be pre-configured or pre-indicated to the UE 115. Then, when the UE 115 receives an indication of the selected set of PCIs, the UE 115 may implicitly apply the pre-configured beam configurations corresponding to the selected set of PCIs.

Figure 2:
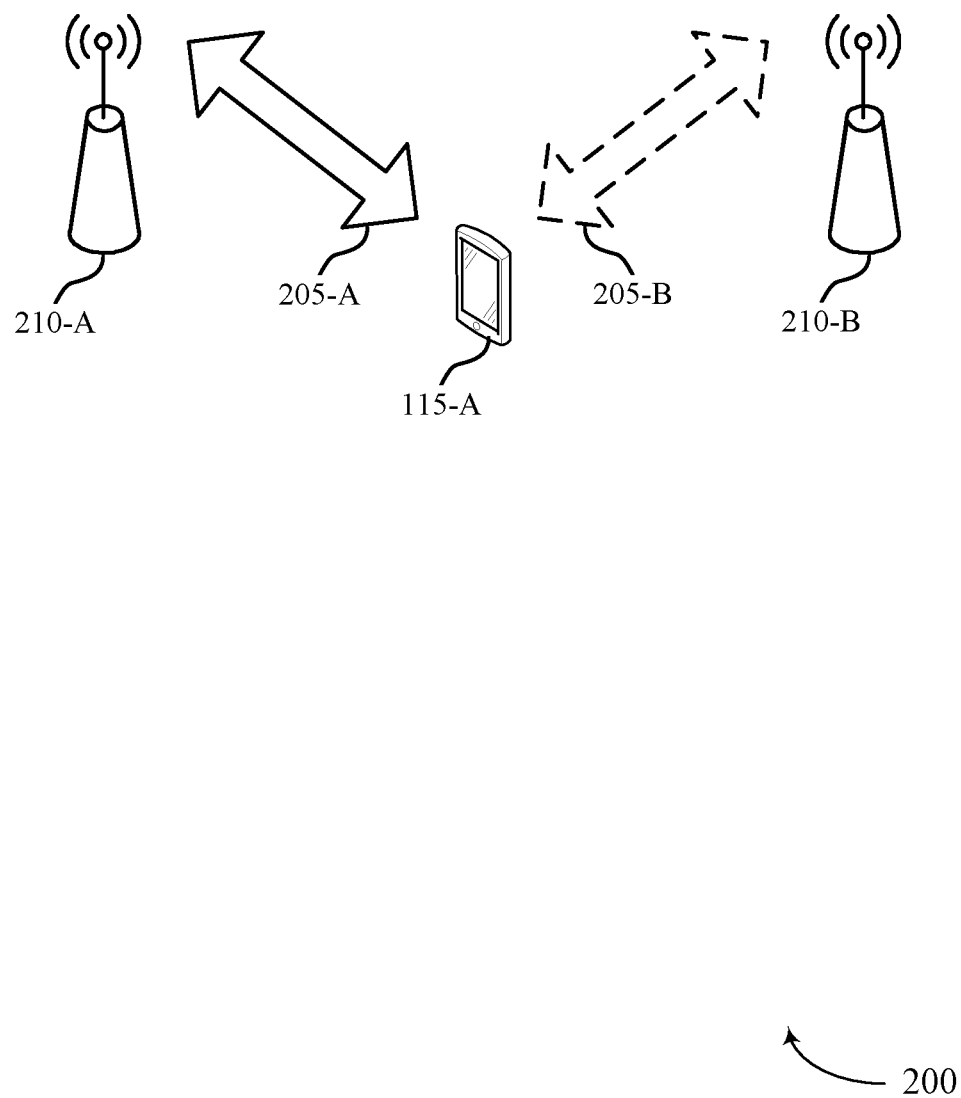
FIG. 2 illustrates an example of a wireless communications system that supports implicit beam indication in accordance with aspects of the present disclosure.

FIG. 2 illustrates an example of a wireless communications system 200 that supports implicit beam indication in accordance with aspects of the present disclosure. In some examples, wireless communications system 200 may implement aspects of wireless communications system 100. The wireless communications system 200 may include UE 115-a, which may be an example of a UE 115 described herein. UE 115-a may communicate with one or more TRPs 210, which may be examples of a base station 105 or a small cell as described herein.

UE 115-a may be configured with one or more cells to communicate with a wireless communications network. UE 115-a may receive an indication of a set of physical cell identifiers (PCIs) and communicate with the network via one or more cells corresponding to one or more the set of PCIs. In some cases, the PCIs may be provided by a base station 105 or one or more TRPs 210. For example, a base station 105 may provide one or more cells for UE 115-a. Additionally, or alternatively, one or more TRPs 210 may be distributed in the wireless communications system 200 and may provide one or more cells for UE 115-a.

The wireless communications system 200 may support enhanced techniques for inter-cell mobility. For example, the wireless communications system 200 may support Layer 1 (L1) and Layer 2 (L2) based inter-cell mobility. In some examples, L1 may refer to the physical layer, and L2 may refer to the MAC, RLC, and PDCP layer.

In some cases, L1 and L2-based inter-cell mobility may include two modes. In a first mode of inter-cell mobility, a serving cell (e.g., each serving cell) may have multiple TRPs 210. In some cases, the TRPs 210 may be at different locations. In the first mode, each TRP 210 may have a different PCI. The PCI for a TRP 210 in the first mode may be carried by a synchronization signal block (SSB) transmitted by the TRP 210. A UE 115 may be served by a subset of the serving cell's PCIs. In some cases, the subset of serving PCIs may be changed via DCI or MAC CE information.

As an example of the first mode, UE 115-*a* may have one serving cell with multiple TRPs 210, such as TRP 210-*a* and TRP 210-*b*. TRP 210-*a* and TRP 210-*b* may provide the active PCIs for UE 115-*a*, which may be indicated to UE 115-*a* via DCI or a MAC CE. For example, TRP 210-*a* may be associated with a first PCI and provide link 205-*a* for UE 115-*a*, and TRP 210-*b* may be associated with a second PCI and provide link 205-*b* for UE 115-*a*. In some examples, TRP 210-*a* and TRP 210-*b* may be distributed to different locations within the wireless communications network 200, which may provide improved spatial diversity for UE 115-*a*. TRP 210-*a* and TRP 210-*b* may each transmit an SSB carrying a respective PCI. UE 115-*a* may receive the SSBs and identify the PCIs for TRP 210-*a* and TRP 210-*b*, respectively.

In a second mode, a UE 115 may be configured with a group of serving cells with a single PCI per serving cell. For example, the UE 115 may be configured with multiple serving cells, where each of the serving cells may have a different PCI. The UE 115 may be configured to measure L1 metrics for a serving cell (e.g., per serving cell) in the group. For example, the UE 115 may measure an L1 reference signal received power (RSRP), a signal plus interference to noise ratio (SINR), a reference signal received quality (RSRQ), or other L1 characteristic metrics, for each candidate serving cell. The UE 115 may be served by a subset of the group of serving cells at a time. In some cases, the subset may be changed by DCI or a MAC CE. A base station 105 (e.g., providing the serving cells) may determine the subset based on an L1 report from the UE 115. For example, the UE 115 may transmit the L1 report for the RSRP, SINR, RSRQ, etc., to a selected serving cell or to an anchor serving cell in the group.

As an example of the second mode, TRP 210-*a* may provide one or more serving cells for UE 115-*a*. For example, TRP 210-*a* may provide a serving cell with a first PCI to provide link 205-*a* for UE 115-*a*. In some cases, TRP 210-*a* may be an example of a base station 105. UE 115-*a* may perform measurements on the one or more serving cells provided by TRP 210-*a* and report the measurements to TRP 210-*a*. TRP 210-*a* may select a subset of the serving cells based on the report and configure the subset as active serving cells for UE 115-*a*. In some other examples, multiple TRPs 210 may provide the serving cells. For example, TRP 210-*a* may provide one or more serving cells, and TRP 210-*b* may provide one or more serving cells. In an example, TRP 210-*b* may provide a second serving cell with a second PCI to provide link 205-*b* for UE 115-*a*.

In some cases, UE 115-*a* may receive an indication of the subset of PCIs in a wake-up signal (WUS). UE 115-*a* may monitor for a WUS in a designated occasion before a discontinuous reception (DRX) on duration. The WUS may include one indicator per UE 115 to signal whether the UE 115 is to wake up for the next configured DRX on duration. As an example, UE 115-*a* may operate in a DRX off period. UE 115-*a* may monitor for a WUS during a designated occasion and detect the WUS. In some cases, the WUS may indicate a subset of active PCIs for UE 115-*a* from a larger set of candidate PCIs.

The wireless communications systems may support beamformed configurations. For example, TRP 210-*a* may apply a TCI state when transmitting on downlink channels or transmitting downlink reference signals to UE 115-*a*. UE 115-*a* may apply spatial relations for uplink channels and reference signals. A TCI state may associate a channel of a previously communicated reference signal with an upcoming communication. For example, TRP 210-*a* may apply a same channel for a downlink shared channel as the channel used to transmit a demodulation reference signal. UE 115-*a* may determine that the downlink shared channel has the same channel as the demodulation reference signal, and UE 115-*a* may apply a beamforming configuration corresponding to the previously received demodulation reference signal to receive the downlink shared channel. In some cases, TCI states and spatial relations may correspond to different beam directions or antenna array configurations. In some cases, TCI states may correspond to downlink channels and reference signals, and spatial relations may correspond to uplink channels and reference signals.

In some wireless communications systems, after a base station 105 indicates a selected subset of PCIs from a set of candidate PCIs, the base station 105 may transmit explicit beamforming configurations for the selected subset of PCIs. The explicit indication is transmitted after the selected subset of PCIs is already configured, which may affect reliability, as a UE 115 may not have the correct beamforming configurations for the PCIs until receiving this signaling, so the UE 115 may miss some communications if applying a wrong beamforming configuration. Additionally, the explicit indication of the selected subset of PCIs may have a signaling overhead for the UE 115.

The techniques described herein provide for an implicit beam indication in inter-cell mobility. For example, UE 115-*a* may receive an indication of beam configurations for the set of candidate PCIs before receiving the indication of the selected subset of PCIs. Then, when UE 115-*a* receives the indication of the selected subset of PCIs, UE 115-*a* may implicitly apply the pre-indicated beam configurations without receiving additional signaling. For example, UE 115-*a* may receive a pre-configured set of beam configurations for a set of candidate PCIs, then UE 115-*a* may receive an indication of a selected subset of PCIs from the candidate PCIs, and UE 115-*a* may apply the configurations from the set of beam configurations which apply to the selected subset of PCIs.

In an example of mode 1, the PCI group may be all candidate PCIs configured per serving cell. In this example, a wakeup signal may indicate the selected PCIs per serving cell for UE 115-*a*. For example, the indication of the selected subset of PCIs may indicate PCIs corresponding to one or more TRPs configured for a serving cell. In an example of mode 2, the PCI group may be PCIs of a group of serving cells configured for L1/L2 based cell selection within the group. In this example, the wakeup signal may indicate selected PCIs corresponding to serving cells in the group for UE 115-*a*. In some cases, UE 115-*a* may receive a beam configuration for each candidate PCI, but UE 115-*a* may apply the beam configurations corresponding to the indicated selected subset of PCI states.

A beam configuration for a PCI state may include indications of TCI states and spatial relations. In some cases, the beam configuration may include uplink and downlink TCI states for downlink channels and reference signals. For example, the beam configuration may indicate which TCI states a TRP 210 and UE 115-*a* use for communicating on a downlink control channel, on a downlink shared channel, a channel state information reference signal (CSI-RS) or a positioning reference signal, among other examples of downlink reference signals. In some cases, the beam configuration may include spatial relations for uplink channels and reference signals. For example, the beam configuration may indicate the spatial relation for an uplink control channel, an uplink shared channel, a sounding reference signal (SRS), a physical random access channel or random access preamble, among other examples of uplink channels or uplink reference signals.

An indication of the beam configurations may be transmitted to UE 115-*a* prior to the selection of the corresponding PCIs. For example, the indication of the beam configurations may be transmitted via downlink control information, a MAC CE, or RRC signaling.

The beam configurations may be extended to other types of communications. For example, the beam configurations may be applied for a pathloss reference signal for uplink transmit power determinations. In some cases, the beam configurations may be applied for periodic traffic, such as semi-periodic scheduling communications or configured grant communications. In some cases, the beam configurations may include parameters for these other types of traffic.

Figure 3:
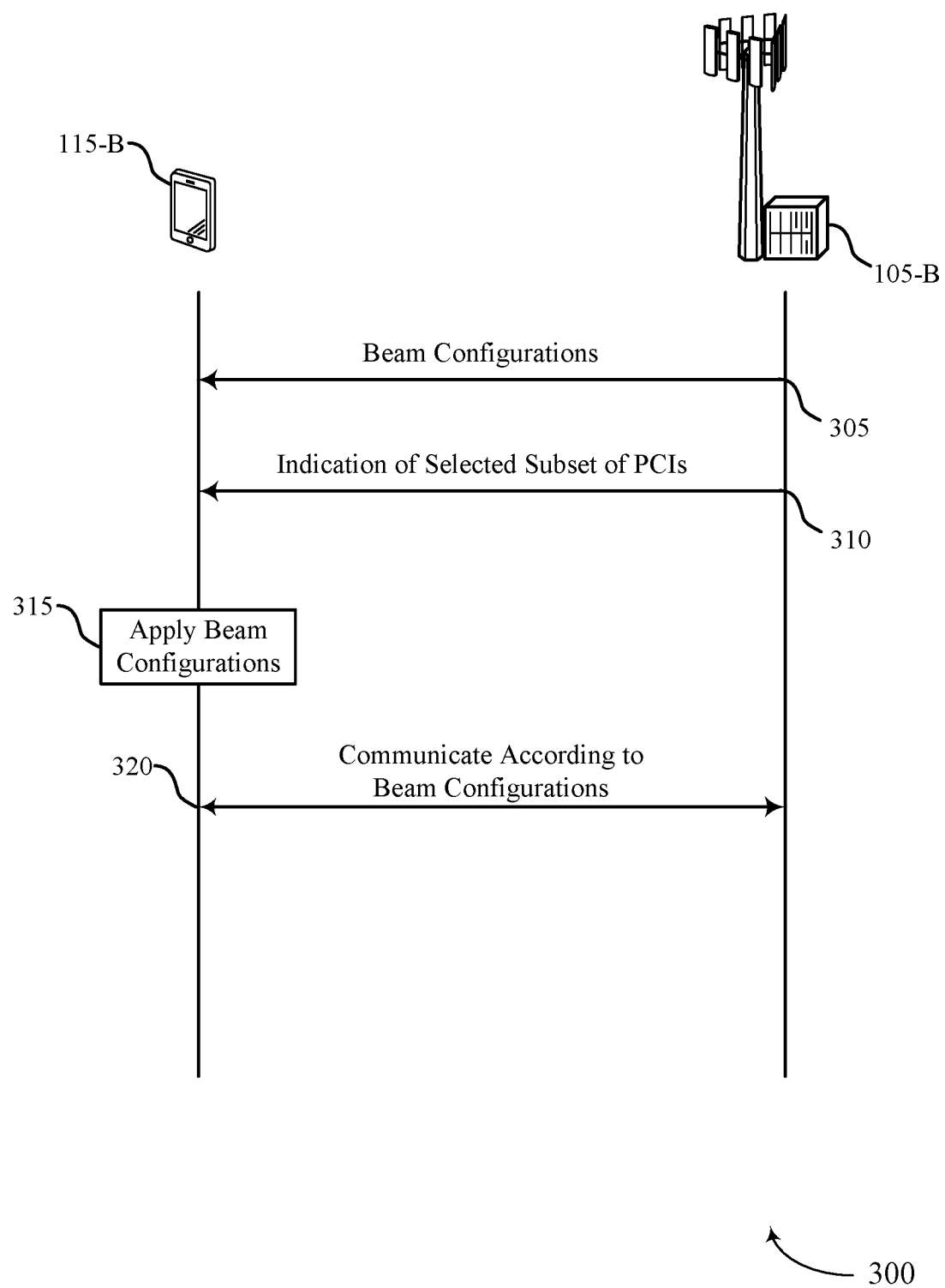
FIG. 3 illustrates an example of a process flow that supports implicit beam indication in accordance with aspects of the present disclosure.

FIG. 3 illustrates an example of a process flow 300 that supports implicit beam indication in accordance with aspects of the present disclosure. In some examples, process flow 300 may be implemented by aspects of wireless communications system 100. The process flow 300 may be implemented by UE 115-*b* or base station 105-*b* or both, which may be respective examples of a UE 115 and a base station 105 described herein.

In some cases, base station 105 may communicate with UE 115-*b* via one or more TRPs. For example, base station 105-*b* may be an example of a serving cell with multiple TRPs at different locations. In some cases, at least some if not each TRP may have a different PCI, which may be indicated to UE 115-*b* by an SSB transmitted by the TRP. In some examples, base station 105-*b* may be an example of a TRP (e.g., with a PCI) which may be configured by a wireless communications network to communicate with UE 115-*b*. In some cases, base station 105 may be an example of a TRP. This may be an example of mode 1 for inter-cell mobility (e.g., L1/L2 inter-cell mobility).

In some other examples, base station 105-*b* may provide one or more serving cells for UE 115-*b*. For example, each serving cell may have a corresponding PCI. In this example, base station 105-*b* may be a serving cell of a group of serving cells. This example may be an example of mode 2 for inter-cell mobility (e.g., L1/L2 inter-cell mobility).

At 305, UE 115-*b* may receive a beam configuration for each PCI of multiple candidate PCIs. Base station 105-*b* may transmit the beam configuration for each PCI of the multiple candidate PCIs via downlink control information, a MAC CE, RRC signaling, or any combination thereof.

In some cases, the beam configuration for each PCI of the multiple candidate PCIs may include one or more uplink TCI states, downlink TCI states, or both, for downlink channels and downlink reference signals. In some cases, the beam configuration for each PCI of the multiple candidate PCIs may include one or more spatial relations for uplink channels and uplink reference signals. In some cases, the downlink channels may include a downlink control channel, a downlink shared channel, or both. In some cases, the downlink reference signals may include a channel state information reference signal, a positioning reference signal, or both. In some cases, the uplink channels may include an uplink shared channel, an uplink control channel, a random access channel, or both. In some examples, the uplink reference signals may include a sounding reference signal, a random access preamble, or both.

At 310, UE 115-*b* may receive an indication of a selected subset of PCIs of the multiple candidate PCIs. In some cases, UE 115-*b* may receive the beam configuration for each PCI of the multiple candidate PCIs before receiving the indication of the selected subset of PCIs.

At 315, UE 115-*b* may apply the beam configuration for each PCI of the selected subset of PCIs based on the indication of the selected subset of PCIs. In some cases, UE 115-*b* may implicitly apply the beam configuration for each PCI of the selected subset of PCIs after receiving the indication of the selected subset of PCIs without receiving an additional explicit indication of beam configurations for the selected subset of PCIs. This may reduce signaling overhead and improve reliability, as UE 115-*b* may be able to apply the beam configurations for the PCIs efficiently and communicate according to the correct configuration, reducing the likelihood of missing communications by applying a wrong beam configuration or not having the beam configuration. In some cases, the beam configuration for each PCI of the multiple candidate PCIs may further be applied for a path loss reference signal configuration for uplink transmit power determinations, a semi-persistent scheduling configuration, a configured grant configuration, or any combination thereof.

At 320, UE 115-*b* and base station 105-*b* may communicate according to the beam configurations for the selected subset of PCIs. For example, UE 115-*b* and base station 105-*b* may communicate on downlink channels or communicate downlink reference signals according to the uplink and downlink TCI states, or UE 115-*b* and base station 105-*b* may communicate on uplink channel or communicate uplink reference signals according to the indicated spatial relations.

By implementing these techniques, UE 115-*b* may implicitly apply the beam configurations based on which PCIs are indicated in the selected subset of PCIs. This may reduce signaling overhead of other systems which may use explicit signaling of the beam configurations after indicating the selected PCIs. Additionally, UE 115-*b* may communicate using the beam configurations, improving reliability by using the correct beam configurations sooner than if UE 115-*b* were to wait for additional explicit beam configuration signaling.

Figure 4:
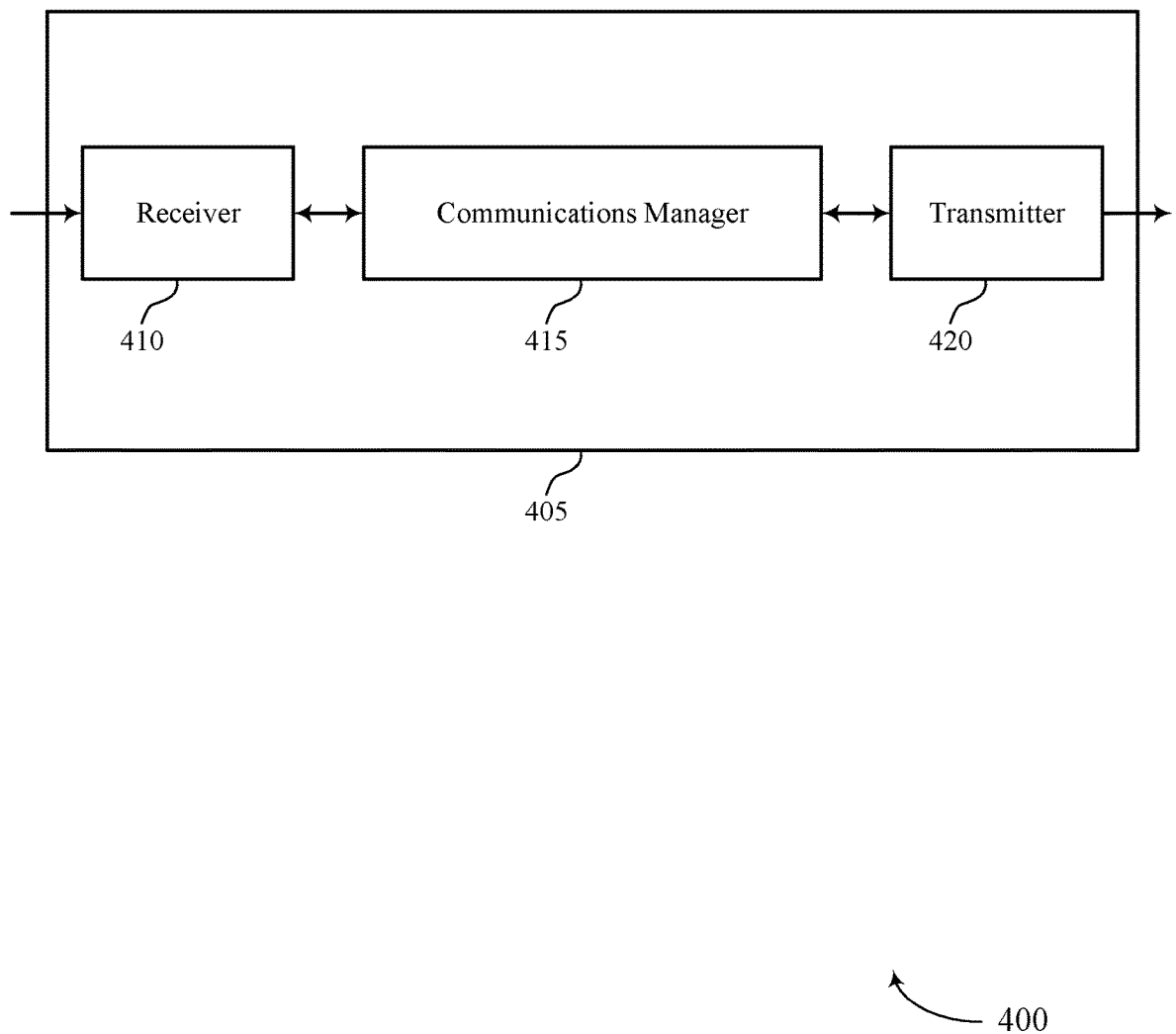
FIGS. 4 and 5 show block diagrams of devices that support implicit beam indication in accordance with aspects of the present disclosure.

FIG. 4 shows a block diagram 400 of a device 405 that supports implicit beam indication in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to implicit beam indication, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive a beam configuration for each physical cell identifier of a set of candidate physical cell identifiers, receive an indication of a selected subset of physical cell identifiers of the set of candidate physical cell identifiers, and apply the beam configuration for each physical cell identifier of the selected subset of physical cell identifiers based on the indication of the selected subset of physical cell identifiers. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the UE communications manager 415 as described herein may be implemented to realize one or more potential advantages. One implementation may allow a UE 115 to reduce signaling overhead by being pre-configured with beam configurations for the candidate PCIs. For example, by pre-configuring the UE with the beam configurations, the UE 115 may not receive an additional signal explicitly indicating the beam configurations for a selected subset of PCIs. Furthermore, the pre-configuration, or pre-indication, may improve reliability for signaling at the UE 115. For example, the UE 115 may apply the beam configurations sooner, which may improve the reliability, as the UE 115 may not be communicating with an incorrect beam configuration.

The transmitter 420 may transmit signals generated by other components of the device 405. In some examples, the transmitter 420 may be collocated with a receiver 410 in a transceiver. For example, the transmitter 420 may be an example of aspects of the transceiver 720 described with reference to FIG. 7. The transmitter 420 may utilize a single antenna or a set of antennas.

Figure 5:
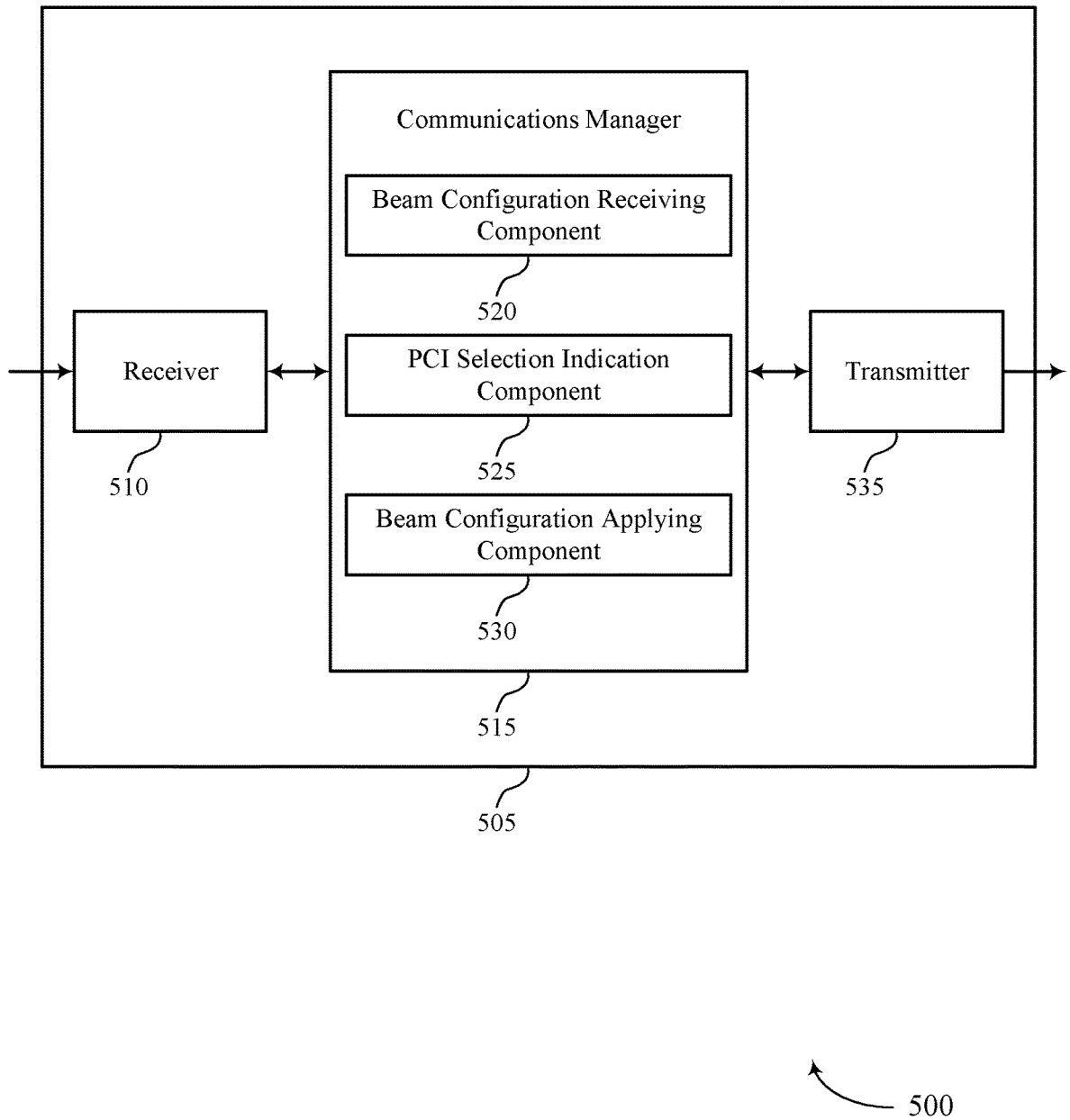

FIG. 5 shows a block diagram 500 of a device 505 that supports implicit beam indication in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to implicit beam indication, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a beam configuration receiving component 520, a PCI selection indication component 525, and a beam configuration applying component 530. The communications manager 515 may be an example of aspects of the communications manager 710 described herein.

The beam configuration receiving component 520 may receive a beam configuration for each physical cell identifier of a set of candidate physical cell identifiers.

The PCI selection indication component 525 may receive an indication of a selected subset of physical cell identifiers of the set of candidate physical cell identifiers.

The beam configuration applying component 530 may apply the beam configuration for each physical cell identifier of the selected subset of physical cell identifiers based on the indication of the selected subset of physical cell identifiers.

The transmitter 535 may transmit signals generated by other components of the device 505. In some examples, the transmitter 535 may be collocated with a receiver 510 in a transceiver. For example, the transmitter 535 may be an example of aspects of the transceiver 720 described with reference to FIG. 7. The transmitter 535 may utilize a single antenna or a set of antennas.

Figure 6:
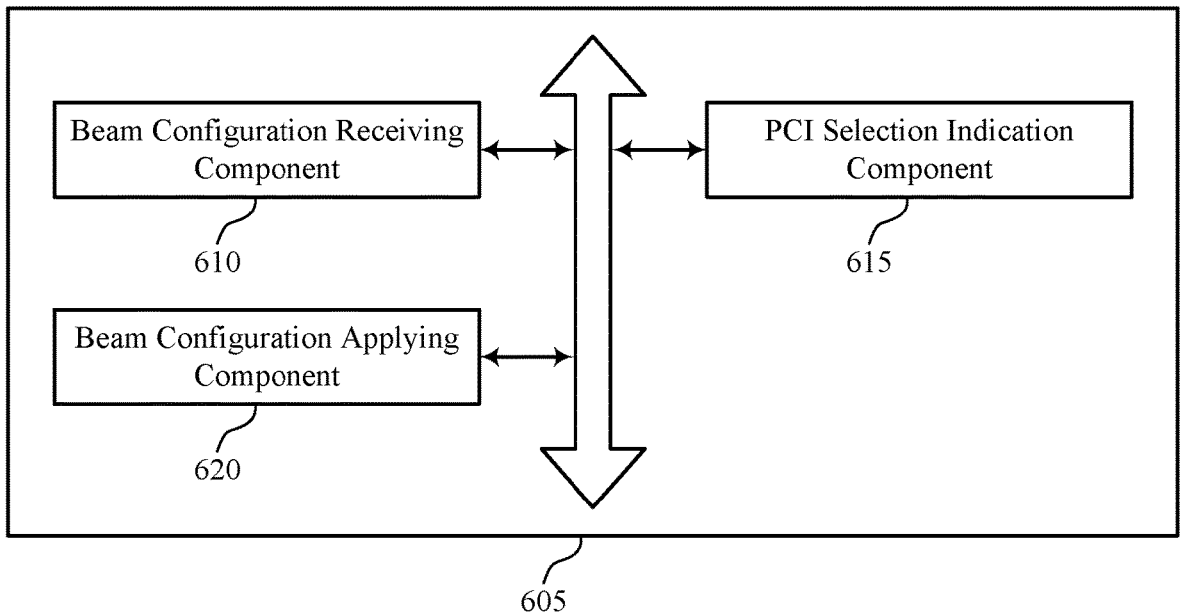
FIG. 6 shows a block diagram of a communications manager that supports implicit beam indication in accordance with aspects of the present disclosure.

FIG. 6 shows a block diagram 600 of a communications manager 605 that supports implicit beam indication in accordance with aspects of the present disclosure. The communications manager 605 may be an example of aspects of a communications manager 415, a communications manager 515, or a communications manager 710 described herein. The communications manager 605 may include a beam configuration receiving component 610, a PCI selection indication component 615, and a beam configuration applying component 620. Each of these components may communicate, directly or indirectly, with one another (e.g., via one or more buses).

The beam configuration receiving component 610 may receive a beam configuration for each physical cell identifier of a set of candidate physical cell identifiers.

In some examples, the beam configuration receiving component 610 may receive the beam configuration for each physical cell identifier before receiving the indication of the selected subset of physical cell identifiers.

In some examples, receiving the beam configuration includes receiving the beam configuration via downlink control information, a medium access control control element, radio resource control signaling, or any combination thereof.

In some cases, the beam configuration for each physical cell identifier of the set of candidate physical cell identifiers includes one or more transmit configuration indicator states for downlink channels and downlink reference signals and includes one or more spatial relations for uplink channels and uplink reference signals.

In some cases, the downlink channels include a downlink control channel, a downlink shared channel, or both. In some cases, the downlink reference signals include a channel state information reference signal, a positioning reference signal, or both. In some cases, the uplink channels include an uplink shared channel, an uplink control channel, a random access channel, or both. In some cases, the uplink reference signals include a sounding reference signal, a random access preamble, or both.

In some cases, the beam configuration for each physical cell identifier of the set of candidate physical cell identifiers includes a path loss reference signal configuration for uplink transmit power determinations, a semi-persistent scheduling configuration, a configured grant configuration, or any combination thereof.

In some cases, the beam configuration for each physical cell identifier of the set of candidate physical cell identifiers is further applied for a path loss reference signal configuration for uplink transmit power determinations, a semi-persistent scheduling configuration, a configured grant configuration, or any combination thereof.

The PCI selection indication component 615 may receive an indication of a selected subset of physical cell identifiers of the set of candidate physical cell identifiers. In some cases, each candidate physical cell identifier of the set of candidate physical cell identifiers respectively corresponds to a transmission/reception point of a set of transmission/reception points configured for a serving cell. In some cases, each physical cell identifier of the selected subset of physical cell identifiers corresponds to a respective transmission/reception point of the set of transmission/reception points configured for the serving cell. In some cases, each physical cell identifier of the set of candidate physical cell identifiers corresponds to a respective serving cell of a group of serving cells. In some cases, each physical cell identifier of the selected subset of physical cell identifiers corresponds to the respective serving cell of the group of serving cells. In some cases, the set of serving cells are configured for Layer 1/Layer 2 based cell selection.

The beam configuration applying component 620 may apply the beam configuration for each physical cell identifier of the selected subset of physical cell identifiers based on the indication of the selected subset of physical cell identifiers.

In some examples, the beam configuration applying component 620 may implicitly apply the beam configuration for each physical cell identifier of the selected subset of physical cell identifiers after receiving the indication of the selected subset of physical cell identifiers without receiving an additional explicit indication of beam configurations for the selected subset of physical cell identifiers.

Figure 7:
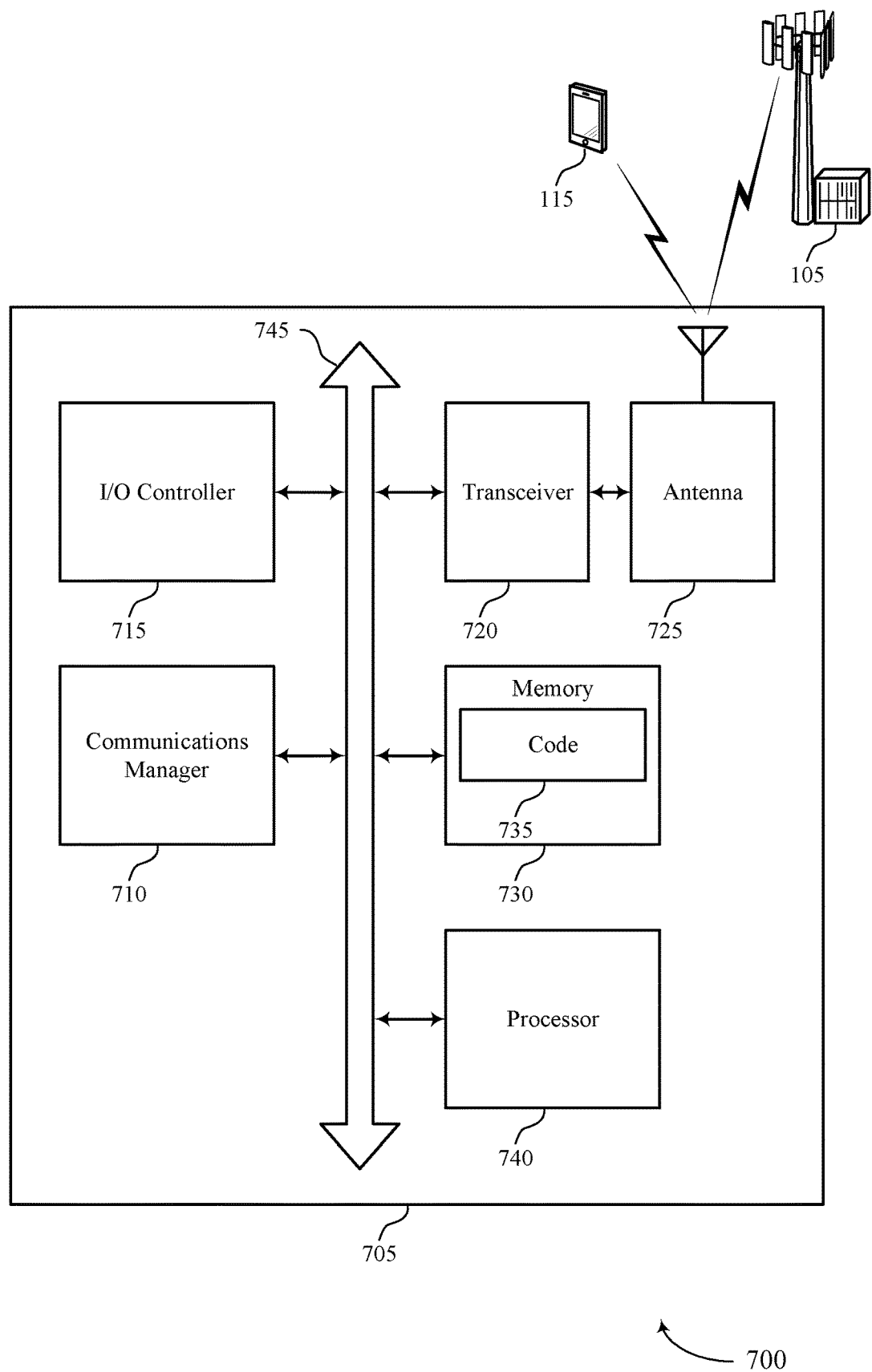
FIG. 7 shows a diagram of a system including a device that supports implicit beam indication in accordance with aspects of the present disclosure.

FIG. 7 shows a diagram of a system 700 including a device 705 that supports implicit beam indication in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive a beam configuration for each physical cell identifier of a set of candidate physical cell identifiers, receive an indication of a selected subset of physical cell identifiers of the set of candidate physical cell identifiers, and apply the beam configuration for each physical cell identifier of the selected subset of physical cell identifiers based on the indication of the selected subset of physical cell identifiers.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting implicit beam indication).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
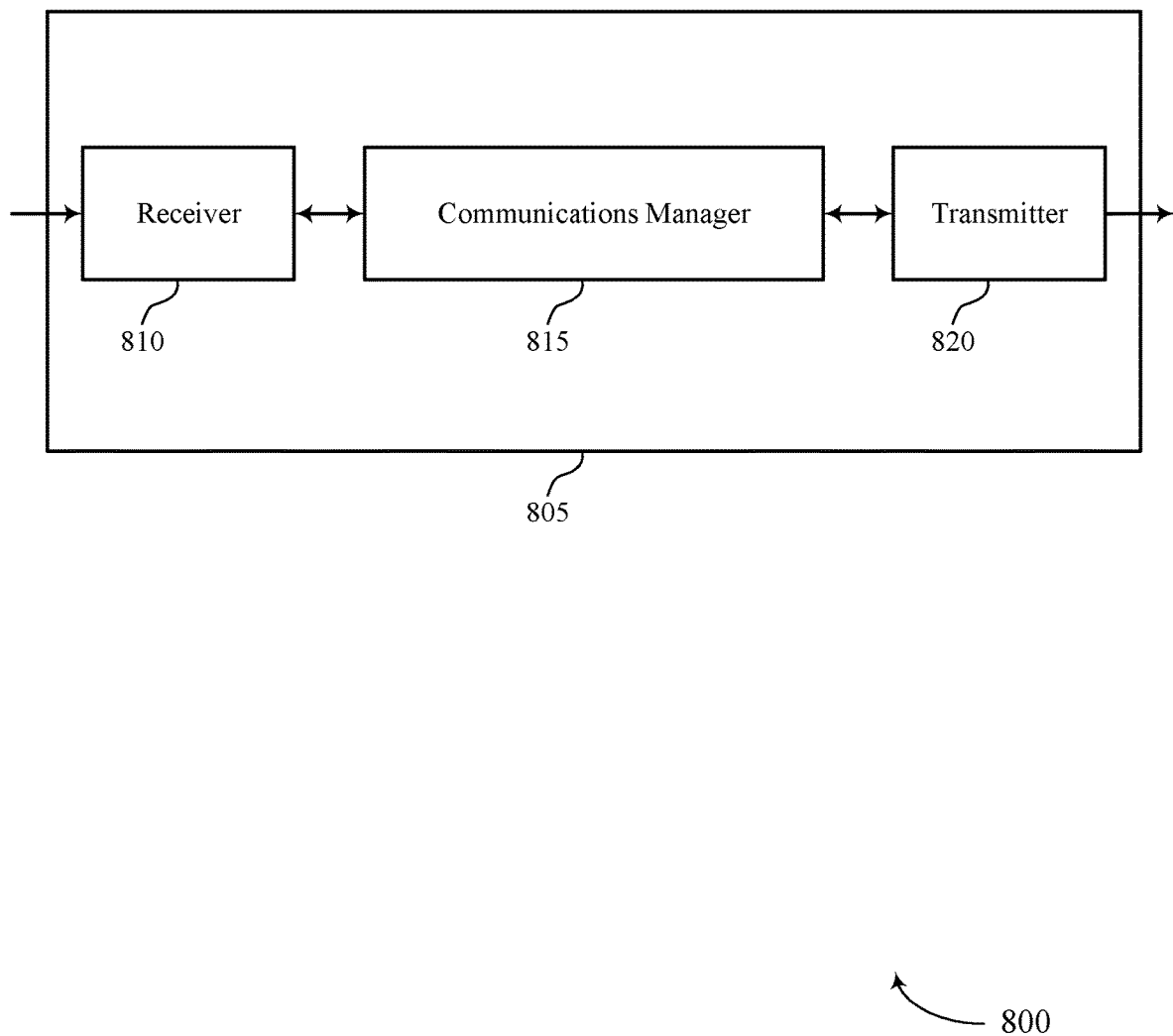
FIGS. 8 and 9 show block diagrams of devices that support implicit beam indication in accordance with aspects of the present disclosure.

FIG. 8 shows a block diagram 800 of a device 805 that supports implicit beam indication in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to implicit beam indication, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit, to a UE, a beam configuration for each physical cell identifier of a set of candidate physical cell identifiers, transmit an indication of a selected subset of physical cell identifiers of the set of candidate physical cell identifiers, and communicate, with the UE, via one or more cells corresponding to the selected subset of physical cell identifiers according to the beam configuration for each physical cell identifier of the selected subset of physical cell identifiers. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver. For example, the transmitter 820 may be an example of aspects of the transceiver 1120 described with reference to FIG. 11. The transmitter 820 may utilize a single antenna or a set of antennas.

Figure 9:
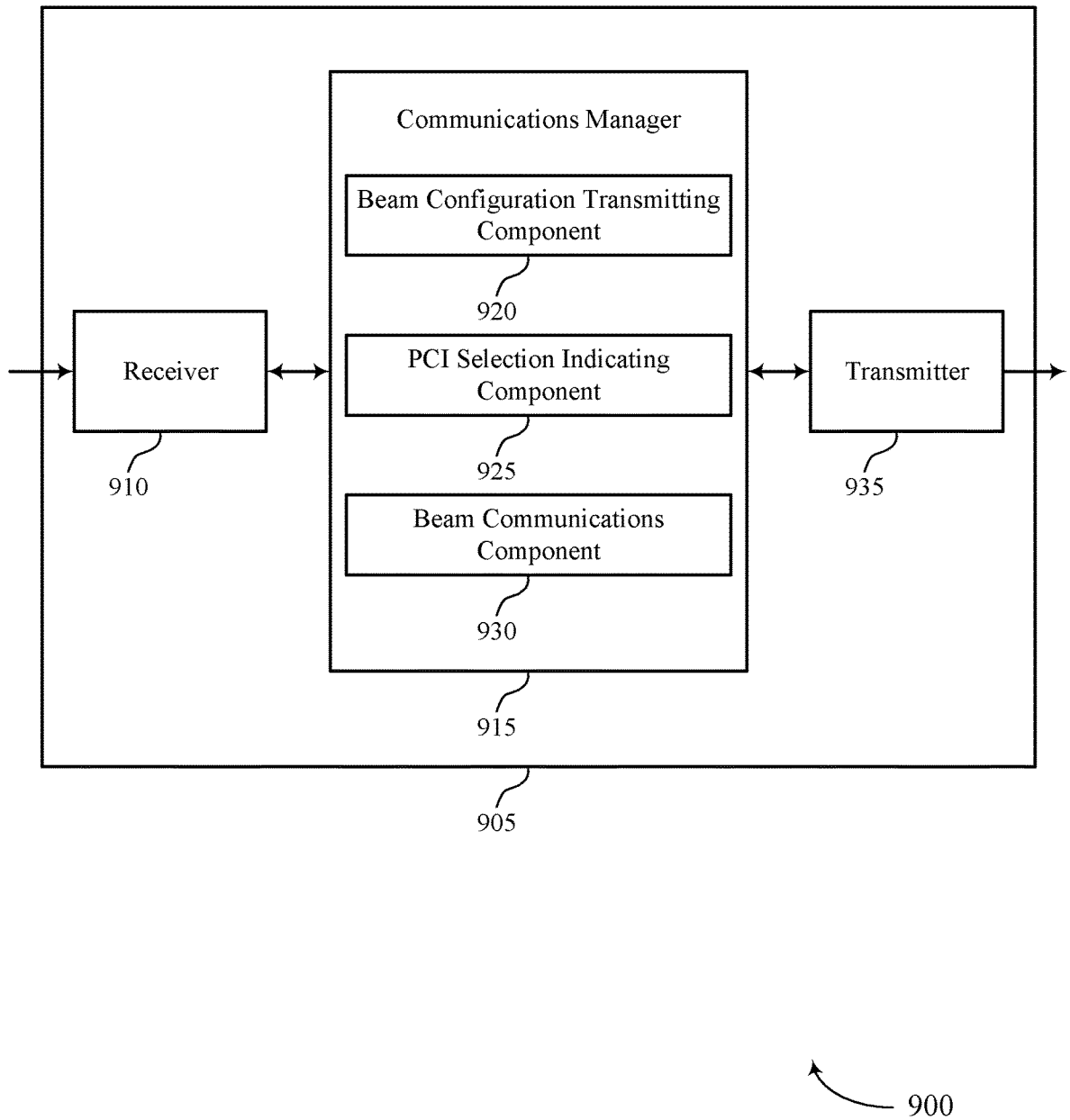

FIG. 9 shows a block diagram 900 of a device 905 that supports implicit beam indication in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to implicit beam indication, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a beam configuration transmitting component 920, a PCI selection indicating component 925, and a beam communications component 930. The communications manager 915 may be an example of aspects of the communications manager 1110 described herein.

The beam configuration transmitting component 920 may transmit, to a UE, a beam configuration for each physical cell identifier of a set of candidate physical cell identifiers.

The PCI selection indicating component 925 may transmit an indication of a selected subset of physical cell identifiers of the set of candidate physical cell identifiers.

The beam communications component 930 may communicate, with the UE, via one or more cells corresponding to the selected subset of physical cell identifiers according to the beam configuration for each physical cell identifier of the selected subset of physical cell identifiers.

The transmitter 935 may transmit signals generated by other components of the device 905. In some examples, the transmitter 935 may be collocated with a receiver 910 in a transceiver. For example, the transmitter 935 may be an example of aspects of the transceiver 1120 described with reference to FIG. 11. The transmitter 935 may utilize a single antenna or a set of antennas.

Figure 10:
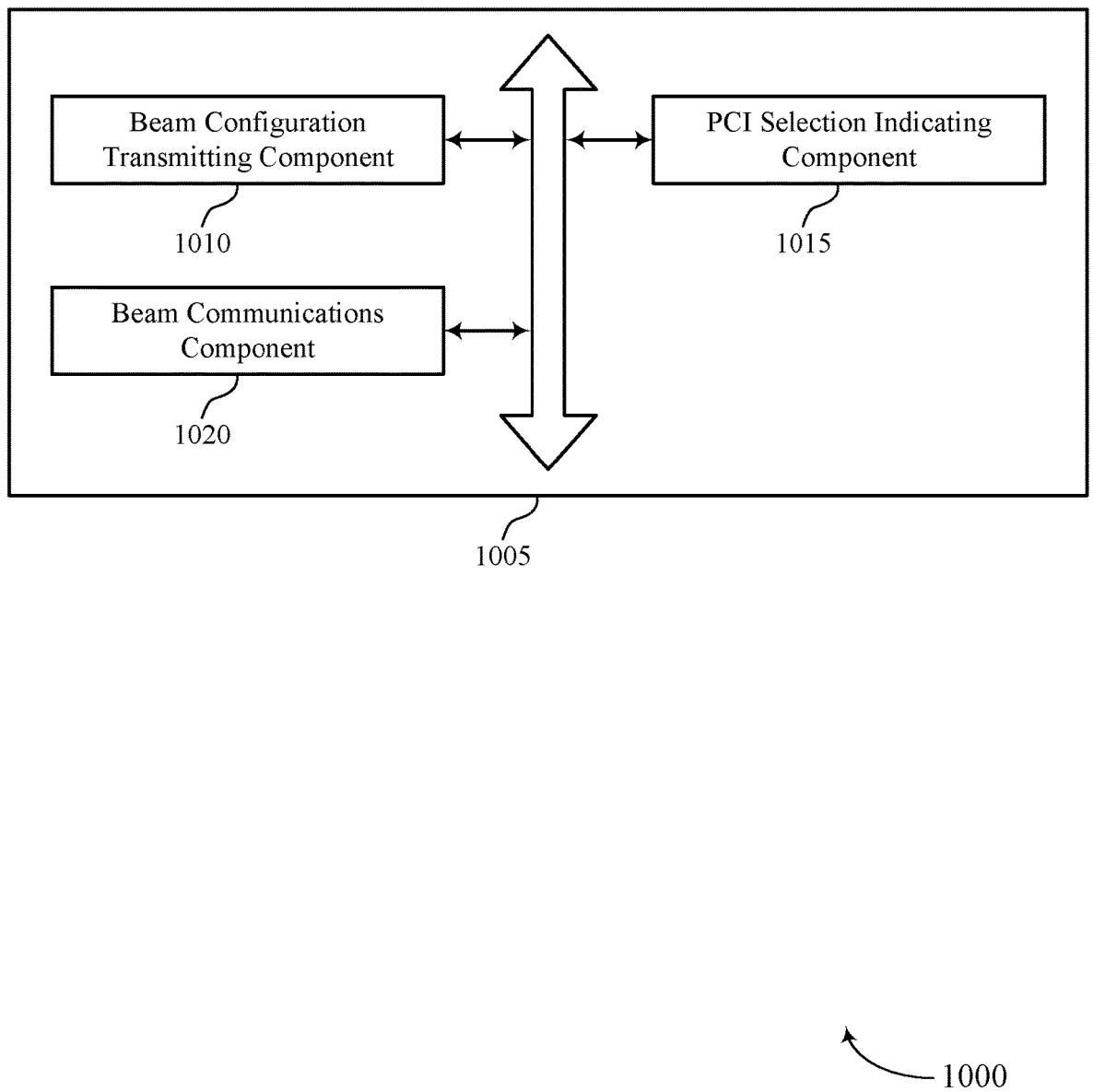
FIG. 10 shows a block diagram of a communications manager that supports implicit beam indication in accordance with aspects of the present disclosure.

FIG. 10 shows a block diagram 1000 of a communications manager 1005 that supports implicit beam indication in accordance with aspects of the present disclosure. The communications manager 1005 may be an example of aspects of a communications manager 815, a communications manager 915, or a communications manager 1110 described herein. The communications manager 1005 may include a beam configuration transmitting component 1010, a PCI selection indicating component 1015, and a beam communications component 1020. Each of these components may communicate, directly or indirectly, with one another (e.g., via one or more buses).

The beam configuration transmitting component 1010 may transmit, to a UE, a beam configuration for each physical cell identifier of a set of candidate physical cell identifiers. In some examples, the beam configuration transmitting component 1010 may transmit the beam configuration for each physical cell identifier before the indication of the selected subset of physical cell identifiers. In some examples, transmitting the beam configuration includes transmitting the beam configuration via downlink control information, a medium access control control element, radio resource control signaling, or any combination thereof.

In some cases, the beam configuration for each physical cell identifier of the set of candidate physical cell identifiers includes one or more transmit configuration indicator states for downlink channels and downlink reference signals and includes one or more spatial relations for uplink channels and uplink reference signals.

In some cases, the downlink channels include a downlink control channel, a downlink shared channel, or both. In some cases, the downlink reference signals include a channel state information reference signal, a positioning reference signal, or both. In some cases, the uplink channels include an uplink shared channel, an uplink control channel, a random access channel, or both. In some cases, the uplink reference signals include a sounding reference signal, a random access preamble, or both.

In some cases, the beam configuration for each physical cell identifier of the set of candidate physical cell identifiers includes a path loss reference signal configuration for uplink transmit power determinations, a semi-persistent scheduling configuration, a configured grant configuration, or any combination thereof.

In some cases, the beam configuration for each physical cell identifier of the set of candidate physical cell identifiers is further applied for a path loss reference signal configuration for uplink transmit power determinations, a semi-persistent scheduling configuration, a configured grant configuration, or any combination thereof.

The PCI selection indicating component 1015 may transmit an indication of a selected subset of physical cell identifiers of the set of candidate physical cell identifiers. In some cases, each candidate physical cell identifier of the set of candidate physical cell identifiers respectively corresponds to a transmission/reception point of a set of transmission/reception points configured for a serving cell. In some cases, each physical cell identifier of the selected subset of physical cell identifiers corresponds to a respective transmission/reception point of the set of transmission/reception points configured for the serving cell. In some cases, each physical cell identifier of the set of candidate physical cell identifiers corresponds to a respective serving cell of a group of serving cells.

In some cases, each physical cell identifier of the selected subset of physical cell identifiers corresponds to the respective serving cell of the group of serving cells. In some cases, the set of serving cells are configured for Layer 1/Layer 2 based cell selection.

The beam communications component 1020 may communicate, with the UE, via one or more cells corresponding to the selected subset of physical cell identifiers according to the beam configuration for each physical cell identifier of the selected subset of physical cell identifiers.

Figure 11:
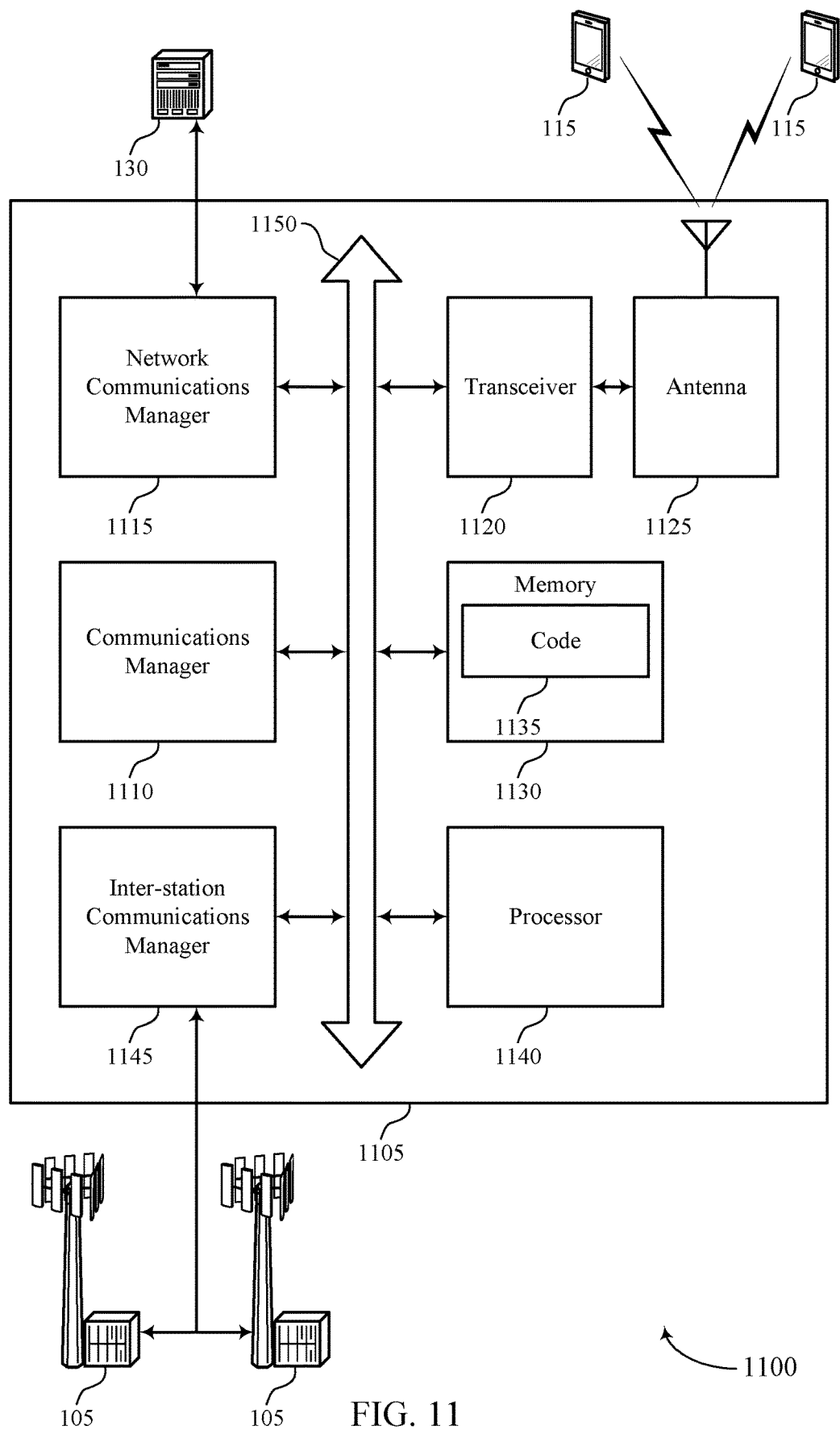
FIG. 11 shows a diagram of a system including a device that supports implicit beam indication in accordance with aspects of the present disclosure.

FIG. 11 shows a diagram of a system 1100 including a device 1105 that supports implicit beam indication in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may transmit, to a UE, a beam configuration for each physical cell identifier of a set of candidate physical cell identifiers, transmit an indication of a selected subset of physical cell identifiers of the set of candidate physical cell identifiers, and communicate, with the UE, via one or more cells corresponding to the selected subset of physical cell identifiers according to the beam configuration for each physical cell identifier of the selected subset of physical cell identifiers.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting implicit beam indication).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
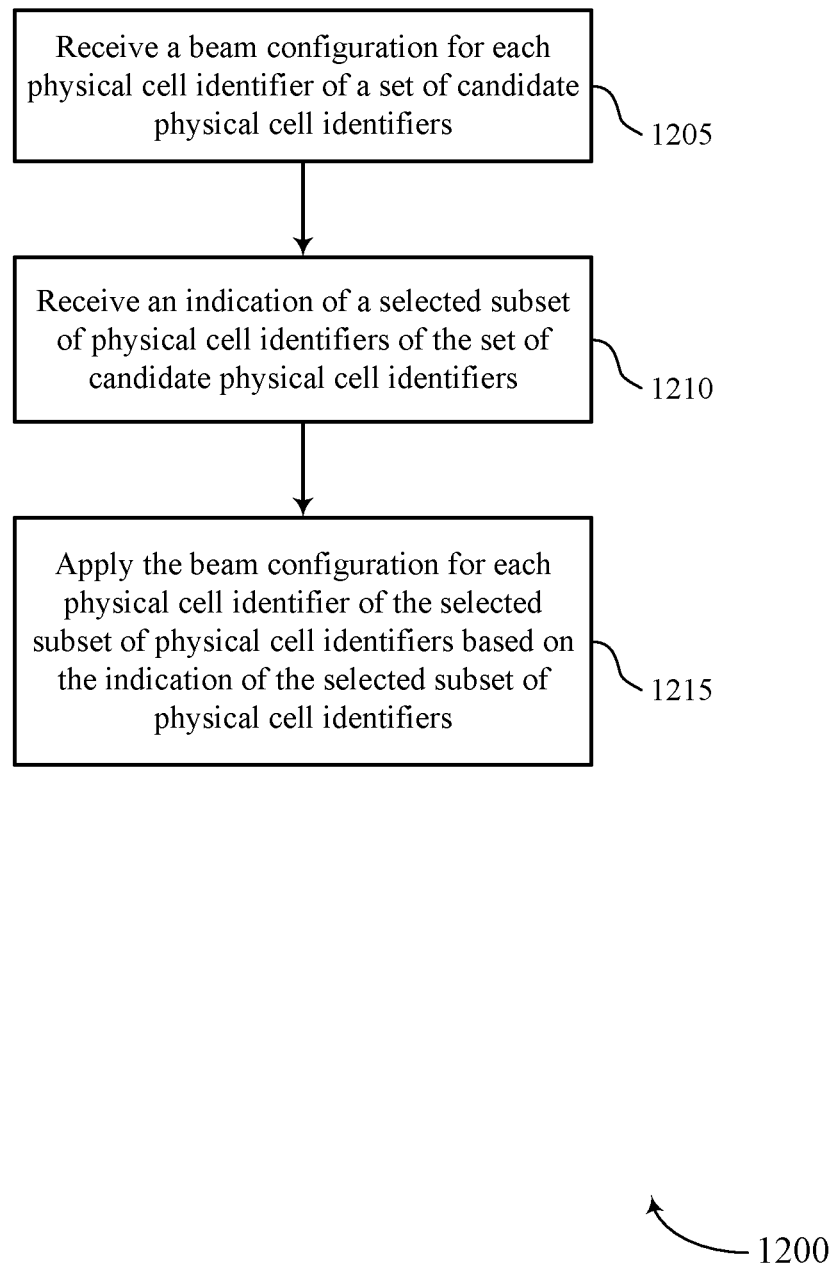
FIGS. 12 through 14 show flowcharts illustrating methods that support implicit beam indication in accordance with aspects of the present disclosure.

FIG. 12 shows a flowchart illustrating a method 1200 that supports implicit beam indication in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may receive a beam configuration for each physical cell identifier of a set of candidate physical cell identifiers. The operations of 1205 may be performed according to the methods described herein. In some examples, aspects of the operations of 1205 may be performed by a beam configuration receiving component as described with reference to FIGS. 4 through 7.

At 1210, the UE may receive an indication of a selected subset of physical cell identifiers of the set of candidate physical cell identifiers. The operations of 1210 may be performed according to the methods described herein. In some examples, aspects of the operations of 1210 may be performed by a PCI selection indication component as described with reference to FIGS. 4 through 7.

At 1215, the UE may apply the beam configuration for each physical cell identifier of the selected subset of physical cell identifiers based on the indication of the selected subset of physical cell identifiers. The operations of 1215 may be performed according to the methods described herein. In some examples, aspects of the operations of 1215 may be performed by a beam configuration applying component as described with reference to FIGS. 4 through 7.

Figure 13:
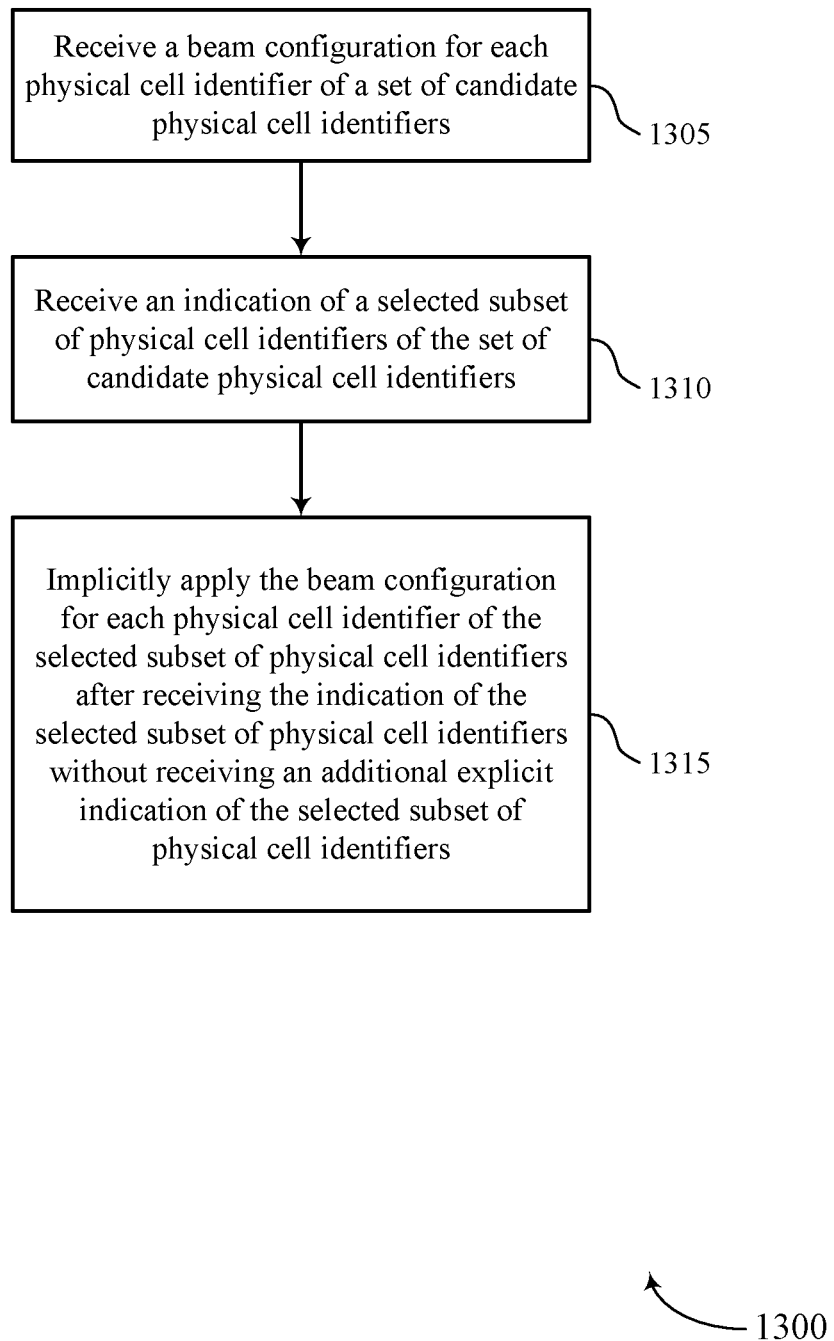

FIG. 13 shows a flowchart illustrating a method 1300 that supports implicit beam indication in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may receive a beam configuration for each physical cell identifier of a set of candidate physical cell identifiers. The operations of 1305 may be performed according to the methods described herein. In some examples, aspects of the operations of 1305 may be performed by a beam configuration receiving component as described with reference to FIGS. 4 through 7.

At 1310, the UE may receive an indication of a selected subset of physical cell identifiers of the set of candidate physical cell identifiers. The operations of 1310 may be performed according to the methods described herein. In some examples, aspects of the operations of 1310 may be performed by a PCI selection indication component as described with reference to FIGS. 4 through 7.

At 1315, the UE may implicitly apply the beam configuration for each physical cell identifier of the selected subset of physical cell identifiers after receiving the indication of the selected subset of physical cell identifiers without receiving an additional explicit indication of beam configurations for the selected subset of physical cell identifiers. The operations of 1315 may be performed according to the methods described herein. In some examples, aspects of the operations of 1315 may be performed by a beam configuration applying component as described with reference to FIGS. 4 through 7.

Figure 14:
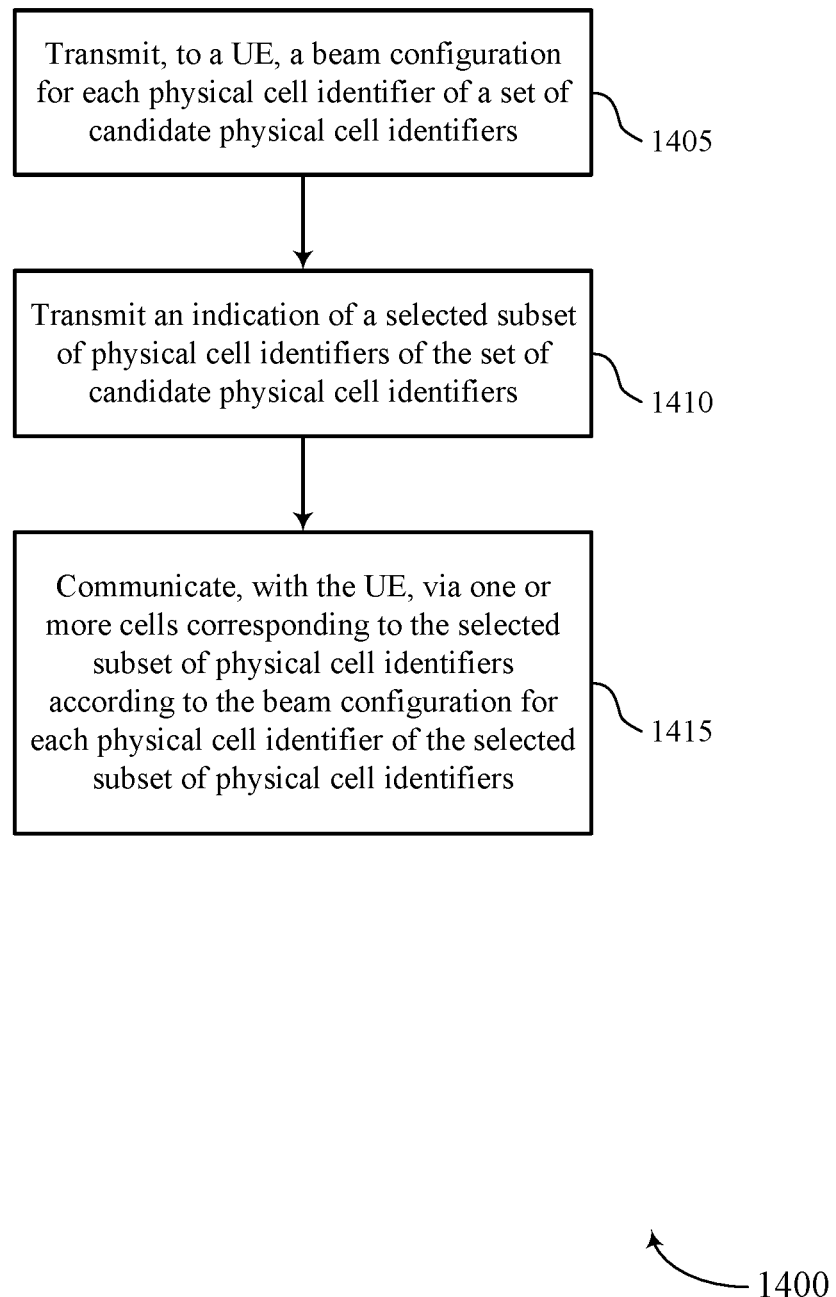

FIG. 14 shows a flowchart illustrating a method 1400 that supports implicit beam indication in accordance with aspects of the present disclosure. The operations of method 1400 may be implemented by a base station 105 or its components as described herein. For example, the operations of method 1400 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1405, the base station may transmit, to a UE, a beam configuration for each physical cell identifier of a set of candidate physical cell identifiers. The operations of 1405 may be performed according to the methods described herein. In some examples, aspects of the operations of 1405 may be performed by a beam configuration transmitting component as described with reference to FIGS. 8 through 11.

At 1410, the base station may transmit an indication of a selected subset of physical cell identifiers of the set of candidate physical cell identifiers. The operations of 1410 may be performed according to the methods described herein. In some examples, aspects of the operations of 1410 may be performed by a PCI selection indicating component as described with reference to FIGS. 8 through 11.

At 1415, the base station may communicate, with the UE, via one or more cells corresponding to the selected subset of physical cell identifiers according to the beam configuration for each physical cell identifier of the selected subset of physical cell identifiers. The operations of 1415 may be performed according to the methods described herein. In some examples, aspects of the operations of 1415 may be performed by a beam communications component as described with reference to FIGS. 8 through 11.

The following provides an overview of aspects of the present disclosure:

Aspect 1: A method for wireless communications at a UE, comprising: receiving a beam configuration for each physical cell identifier of a plurality of candidate physical cell identifiers; receiving an indication of a selected subset of physical cell identifiers of the plurality of candidate physical cell identifiers; and applying the beam configuration for each physical cell identifier of the selected subset of physical cell identifiers based at least in part on the indication of the selected subset of physical cell identifiers.

Aspect 2: The method of aspect 1, wherein receiving the beam configuration for each physical cell identifier comprises: receiving the beam configuration for each physical cell identifier before receiving the indication of the selected subset of physical cell identifiers.

Aspect 3: The method of aspect 1, wherein applying the beam configuration for each physical cell identifier of the selected subset of physical cell identifiers comprises: implicitly applying the beam configuration for each physical cell identifier of the selected subset of physical cell identifiers after receiving the indication of the selected subset of physical cell identifiers without receiving an additional explicit indication of beam configurations for the selected subset of physical cell identifiers.

Aspect 4: The method of any of aspects 1 through 3, wherein the beam configuration for each physical cell identifier of the plurality of candidate physical cell identifiers comprises one or more transmit configuration indicator states for downlink channels and downlink reference signals and comprises one or more spatial relations for uplink channels and uplink reference signals.

Aspect 5: The method of aspect 4, wherein the downlink channels include a downlink control channel, a downlink shared channel, or both.

Aspect 6: The method of any of aspects 4 through 5, wherein the downlink reference signals include a channel state information reference signal, a positioning reference signal, or both.

Aspect 7: The method of any of aspects 4 through 6, wherein the uplink channels include an uplink shared channel, an uplink control channel, a random access channel, or both.

Aspect 8: The method of any of aspects 4 through 7, wherein the uplink reference signals include a sounding reference signal, a random access preamble, or both.

Aspect 9: The method of any of aspects 1 through 8, wherein receiving the beam configuration comprises receiving the beam configuration via DCI, a MAC CE, RRC signaling, or any combination thereof.

Aspect 10: The method of any of aspects 1 through 9, wherein the beam configuration for each physical cell identifier of the plurality of candidate physical cell identifiers comprises a path loss reference signal configuration for uplink transmit power determinations, a semi-persistent scheduling configuration, a configured grant configuration, or any combination thereof.

Aspect 11: The method of any of aspects 1 through 10, wherein the beam configuration for each physical cell identifier of the plurality of candidate physical cell identifiers is further applied for a path loss reference signal configuration for uplink transmit power determinations, a semi-persistent scheduling configuration, a configured grant configuration, or any combination thereof.

Aspect 12: The method of any of aspects 1 through 11, wherein each candidate physical cell identifier of the plurality of candidate physical cell identifiers respectively corresponds to a transmission/reception point of a plurality of transmission/reception points configured for a serving cell.

Aspect 13: The method of aspect 12, wherein each physical cell identifier of the selected subset of physical cell identifiers corresponds to a respective transmission/reception point of the plurality of transmission/reception points configured for the serving cell.

Aspect 14: The method of any of aspects 1 through 13, wherein each physical cell identifier of the plurality of candidate physical cell identifiers corresponds to a respective serving cell of a group of serving cells.

Aspect 15: The method of aspect 14, wherein each physical cell identifier of the selected subset of physical cell identifiers corresponds to the respective serving cell of the group of serving cells.

Aspect 16: The method of any of aspects 14 through 15, wherein the plurality of serving cells are configured for Layer 1/Layer 2 based cell selection.

Aspect 17: A method for wireless communications at a base station, comprising: transmitting, to a UE, a beam configuration for each physical cell identifier of a plurality of candidate physical cell identifiers; transmitting an indication of a selected subset of physical cell identifiers of the plurality of candidate physical cell identifiers; and communicating, with the UE, via one or more cells corresponding to the selected subset of physical cell identifiers according to the beam configuration for each physical cell identifier of the selected subset of physical cell identifiers.

Aspect 18: The method of aspect 17, wherein transmitting the beam configuration for each physical cell identifier comprises: transmitting the beam configuration for each physical cell identifier before the indication of the selected subset of physical cell identifiers.

Aspect 19: The method of any of aspects 17 through 18, wherein the beam configuration for each physical cell identifier of the plurality of candidate physical cell identifiers comprises one or more transmit configuration indicator states for downlink channels and downlink reference signals and comprises one or more spatial relations for uplink channels and uplink reference signals.

Aspect 20: The method of aspect 19, wherein the downlink channels include a downlink control channel, a downlink shared channel, or both.

Aspect 21: The method of any of aspects 19 through 20, wherein the downlink reference signals include a CSI-RS, a PRS, or both.

Aspect 22: The method of any of aspects 19 through 21, wherein the uplink channels include an uplink shared channel, an uplink control channel, a random access channel, or both.

Aspect 23: The method of any of aspects 19 through 22, wherein the uplink reference signals include a sounding reference signal, a random access preamble, or both.

Aspect 24: The method of any of aspects 17 through 23, wherein transmitting the beam configuration comprises transmitting the beam configuration via DCI, a MAC CE, RRC signaling, or any combination thereof.

Aspect 25: The method of any of aspects 17 through 24, wherein the beam configuration for each physical cell identifier of the plurality of candidate physical cell identifiers comprises a path loss reference signal configuration for uplink transmit power determinations, a semi-persistent scheduling configuration, a configured grant configuration, or any combination thereof.

Aspect 26: The method of any of aspects 17 through 25, wherein the beam configuration for each physical cell identifier of the plurality of candidate physical cell identifiers is further applied for a path loss reference signal configuration for uplink transmit power determinations, a semi-persistent scheduling configuration, a configured grant configuration, or any combination thereof.

Aspect 27: The method of any of aspects 17 through 26, wherein each candidate physical cell identifier of the plurality of candidate physical cell identifiers respectively corresponds to a transmission/reception point of a plurality of transmission/reception points configured for a serving cell.

Aspect 28: The method of aspect 27, wherein each physical cell identifier of the selected subset of physical cell identifiers corresponds to a respective transmission/reception point of the plurality of transmission/reception points configured for the serving cell.

Aspect 29: The method of any of aspects 17 through 28, wherein each physical cell identifier of the plurality of candidate physical cell identifiers corresponds to a respective serving cell of a group of serving cells.

Aspect 30: The method of aspect 29, wherein each physical cell identifier of the selected subset of physical cell identifiers corresponds to the respective serving cell of the group of serving cells.

Aspect 31: The method of any of aspects 29 through 30, wherein the plurality of serving cells are configured for Layer 1/Layer 2 based cell selection.

Aspect 32: An apparatus for wireless communications at a UE, comprising a processor; memory coupled with the processor; and instructions stored in the memory and executable by the processor to cause the apparatus to perform a method of any of aspects 1 through 16.

Aspect 33: An apparatus for wireless communications at a UE, comprising at least one means for performing a method of any of aspects 1 through 16.

Aspect 34: A non-transitory computer-readable medium storing code for wireless communications at a UE, the code comprising instructions executable by a processor to perform a method of any of aspects 1 through 16.

Aspect 35: An apparatus for wireless communications at a base station, comprising a processor; memory coupled with the processor; and instructions stored in the memory and executable by the processor to cause the apparatus to perform a method of any of aspects 17 through 31.

Aspect 36: An apparatus for wireless communications at a base station, comprising at least one means for performing a method of any of aspects 17 through 31.

Aspect 37: A non-transitory computer-readable medium storing code for wireless communications at a base station, the code comprising instructions executable by a processor to perform a method of any of aspects 17 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
receiving control signaling indicating a beam configuration for each physical cell identifier of a plurality of candidate physical cell identifiers, wherein the beam configuration indicates one or more transmit configuration indicator states for each physical cell identifier of the plurality of candidate physical cell identifiers, wherein the one or more transmit configuration indicator states are associated with downlink channels and downlink reference signals and comprise one or more spatial relations for uplink channels and uplink reference signals;
receiving an indication of one or more physical cell identifiers of the plurality of candidate physical cell identifiers; and
applying the beam configuration for each physical cell identifier of the one or more physical cell identifiers based at least in part on the indication of the one or more physical cell identifiers.

2. The method of claim 1, wherein receiving the control signaling comprises:
receiving the control signaling indicating the beam configuration for each physical cell identifier before receiving the indication of the one or more physical cell identifiers.

3. The method of claim 1, wherein applying the beam configuration for each physical cell identifier of the one or more physical cell identifiers comprises:
applying the beam configuration for each physical cell identifier of the one or more physical cell identifiers after receiving the indication of the one or more physical cell identifiers without receiving an additional explicit indication of beam configurations for the one or more physical cell identifiers.

4. The method of claim 1, wherein the one or more transmit configuration indicator states are associated with downlink channels or downlink reference signals, or both, and the beam configuration further indicates one or more spatial relations for uplink channels or uplink reference signals, or both.

5. The method of claim 4, wherein the downlink channels include a downlink control channel, a downlink shared channel, or both.

6. The method of claim 4, wherein the downlink reference signals include a channel state information reference signal, a positioning reference signal, or both.

7. The method of claim 4, wherein the uplink channels include an uplink shared channel, an uplink control channel, a random access channel, or both.

8. The method of claim 4, wherein the uplink reference signals include a sounding reference signal, a random access preamble, or both.

9. The method of claim 1, wherein receiving the beam configuration further comprises:
receiving the control signaling via downlink control information, a medium access control control element, radio resource control signaling, or any combination thereof.

10. The method of claim 1, wherein the beam configuration for each physical cell identifier of the plurality of candidate physical cell identifiers comprises a path loss reference signal configuration for uplink transmit power determinations, a semi-persistent scheduling configuration, a configured grant configuration, or any combination thereof.

11. The method of claim 1, wherein the beam configuration for each physical cell identifier of the plurality of candidate physical cell identifiers is further applied for a path loss reference signal configuration for uplink transmit power determinations, a semi-persistent scheduling configuration, a configured grant configuration, or any combination thereof.

12. The method of claim 1, wherein each candidate physical cell identifier of the plurality of candidate physical cell identifiers respectively corresponds to a transmission/reception point of a plurality of transmission/reception points configured for a serving cell.

13. The method of claim 12, wherein each physical cell identifier of the one or more physical cell identifiers corresponds to a respective transmission/reception point of the plurality of transmission/reception points configured for the serving cell.

14. The method of claim 1, wherein each physical cell identifier of the plurality of candidate physical cell identifiers corresponds to a respective serving cell of a plurality of serving cells.

15. The method of claim 14, wherein the plurality of serving cells are configured for Layer 1/Layer 2 based cell selection.

16. The method of claim 1, wherein the downlink channels include a downlink control channel, a downlink shared channel, or both.

17. A method for wireless communications at a base station, comprising:
transmitting, to a user equipment (UE), control signaling indicating a beam configuration for each physical cell identifier of a plurality of candidate physical cell identifiers, wherein the beam configuration indicates one or more transmit configuration indicator states for each physical cell identifier of the plurality of candidate physical cell identifiers, wherein the one or more transmit configuration indicator states are associated with downlink channels and downlink reference signals and comprise one or more spatial relations for uplink channels and uplink reference signals;
transmitting an indication of one or more physical cell identifiers of the plurality of candidate physical cell identifiers; and
communicating, with the UE, via one or more cells corresponding to the one or more physical cell identifiers according to the beam configuration for each physical cell identifier of the one or more physical cell identifiers.

18. The method of claim 17, wherein transmitting the control signaling comprises:
transmitting the control signaling indicating the beam configuration for each physical cell identifier before the indication of the one or more physical cell identifiers.

19. An apparatus for wireless communications at a user equipment (UE), comprising:
one or more processors,
one or more memories coupled with the one or more processors; and
instructions stored in the one or more memories and executable by the one or more processors to cause the UE to:
receive control signaling indicating a beam configuration for each physical cell identifier of a plurality of candidate physical cell identifiers, wherein the beam configuration indicates one or more transmit configuration indicator states for each physical cell identifier of the plurality of candidate physical cell identifiers, wherein the one or more transmit configuration indicator states are associated with downlink channels and downlink reference signals and comprise one or more spatial relations for uplink channels and uplink reference signals;

receive an indication of one or more physical cell identifiers of the plurality of candidate physical cell identifiers; and apply the beam configuration for each physical cell identifier of the one or more physical cell identifiers based at least in part on the indication of the one or more physical cell identifiers.

* * * * *